July 19, 1938.    J. R. BUCHANAN ET AL    2,124,184
WATERING CAN ROSES
Filed July 16, 1937

Inventors:
James Robert Buchanan.
Thomas William Watts.
per Ferdinand Broster Bonhardt
Attorney.

Patented July 19, 1938

2,124,184

UNITED STATES PATENT OFFICE 2,124,184

WATERING-CAN ROSE

James Robert Buchanan and Thomas William Watts, Manchester, England

Application July 16, 1937, Serial No. 153,988
In Great Britain September 2, 1936

3 Claims. (Cl. 299—102)

This invention relates to that kind of watering-can rose which is composed of two separable parts, one consisting of a comparatively stiff disc and carrying the spray orifice or orifices, and the other being of yielding material such as soft rubber and having an aperture in it for engagement with the water-can spout.

Previous to our invention it has been proposed in a spraying attachment of the said kind, to arrange the junction of the separable parts at the periphery of the said disc and form the yielding part funnel-like with an inwardly projecting annular flange or bead acting on the periphery of the disc to hold it in position in the yielding part, and with an external neck or boss through which the said aperture extends.

The main object of our invention is to provide a spraying attachment of the said kind which, although giving when desired a very easy separation of the parts as heretofore, provides a very secure attachment of the parts capable of withstanding high liquid pressures and rendering the stiff part less liable to distortion by the pressure or being roughly handled.

We attain the said object by the means illustrated in the accompanying drawing, wherein—

Figure 1:
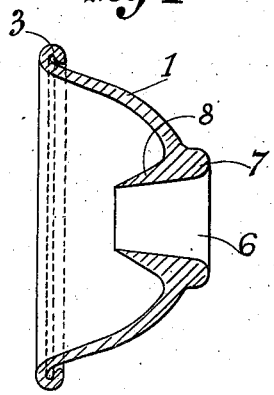
Figure 1 is a view in vertical section of one part of a two-part spraying attachment.
Figure 2:
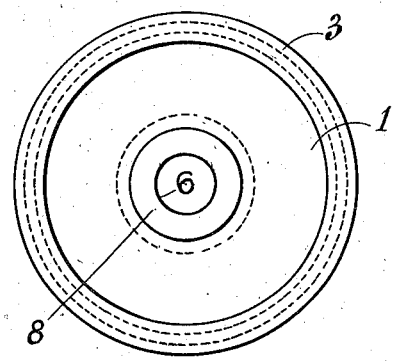
Figure 2 is a front elevation thereof.
Figure 3:
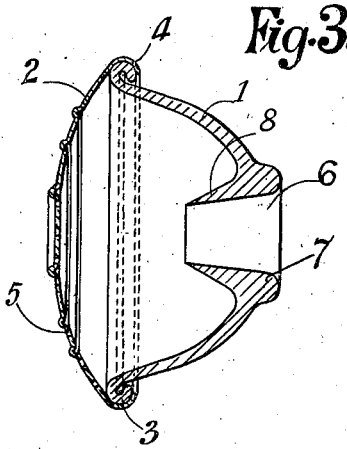
Figure 3 is a view in vertical section of the two parts assembled together.
Figure 4:
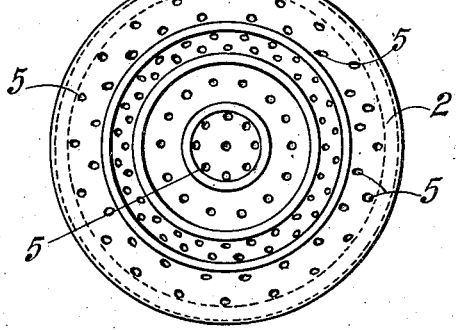
Figure 4 is a front elevation of the assembled parts.

Referring to the drawing, in the construction shown in Figures 1 to 4, as applied by way of example to a watering rose for attachment to a watering can, we form the rose in two separate parts 1 and 2. The substantially funnel shaped part 1 is shown separately in Figures 1 and 2 and is composed of soft rubber or similarly resiliently yielding material. As can be seen from the drawing, the wall thickness of the part 1 is small relative to the size of the said part and therefore the resiliency of the material can be utilized fully for distorting or collapsing the part for the hereinafter stated purpose. It has an external flange or bead 3 and an internal boss 4 provided with an aperture into which the end of the spout of a watering can can be pushed. The part 2 is of sheet metal or other stiff material and has an inwardly turned continuous bead or flange 4 preformed on the part 2 for detachable engagement with the flange or bead 3 of the part 1. As shown in Figure 3, the bead or flange 4 embraces or hooks round the flange or bead 3 to produce an inter-locking effect which gives a secure liquid-tight connection capable of withstanding considerable liquid pressure, which operates to press the flange or bead 3 into tighter internal engagement with the bead or flange 4 and thereby automatically strengthens the connection. In the absence of liquid pressure, the part 1 can be readily distorted or collapsed by hand to disengage the flange or bead 3 from the bead or flange 4 or engage the flange or bead 3 with the bead or flange 4.

The part 2 is provided with the required spray orifices 5. The bead or flange 4 stiffens the part 2 at the rim and thereby renders it more capable of resisting high liquid pressures and damage by rough handling. The aperture 6 provided in the part 1 for frictional engagement by the said spout, is formed in a neck 7 which has an internal portion 8. The internal portion of the neck 7 presses closely round the spout to form a liquid tight joint and its action is assisted by any liquid pressure existing in the rose.

Figure 5:
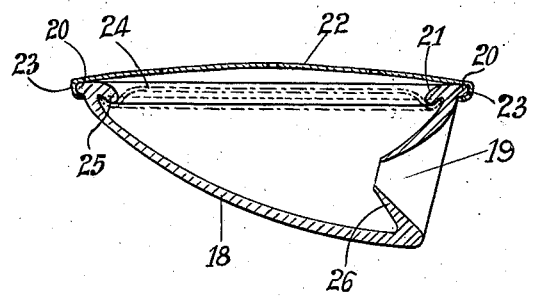
Figure 5 is a side view in section showing a further construction of a two-part spraying attachment.

In the construction shown in Figure 5, the rose has a part 18 of rubber or other similarly resiliently yielding material having a lateral orifice 19 to receive the end of the spout. The orifice 19 extends through an internal neck 20 which is capable of stretching or expanding elastically to receive and grip the said end and form a liquid tight joint therewith. The part 18 has an external, continuous bead or flange 20 and an internal bead or flange 21 providing a continuous recess at its rear or under side. The rose has also a part of metal or other stiff material 22 provided with spray orifices and having an inwardly turned, continuous bead or flange 23 which engages the bead or flange 20 in hook-like or interlocking manner and thus produces a secure, liquid tight joint which however remains readily separable when separation is required. As an alternative to the part 22, or in addition thereto but for alternative use instead of the part 22, the said rose may have the part 24 shown in dot-and-dash lines. The part 24 is of metal or other stiff material and has spray orifices and an outwardly turned, continuous bead or flange 25 which fits tightly in the open top of the part 18 and intimately engages the bead 21 and occupies the recess in the bead 21, to form a secure, liquid-tight joint between the parts.

We claim—

1. A watering-can rose comprising in combination a part of resilient material of substantially funnel shape the wall thickness of which is small relative to its size, an external peripheral bead on the said part, a second part of rigid material having spraying holes, and an inwardly turned peripheral flange completely preformed on the said second part before its assembly with the first named part for readily engaging and hooking annularly round the said external bead by distortion of the first named part.

2. A watering-can rose comprising in combination a flexible rubber rose body having an entrance aperture and a discharge aperture, a sleeve on the said body surrounding the said entrance aperture and lying partly inside and partly outside the said body, a flexible curled annular bead on the outside of the said body surrounding the said body around the said discharge aperture, a rigid, perforated rose disc to cover the said discharge aperture, a preformed inwardly curled annular flange on the periphery of the rose disc for detachably embracing and interlocking with the said curled bead, the rose disc being readily detachable from the rose body by collapse of the rose body and consequent disengagement of the said bead from the said flange, and the engagement of the bead with the flange being strengthened by water pressure in the rose.

3. A watering-can rose comprising in combination a flexible rubber rose body, an external bead thereon, an externally tapered, flexible rubber neck on the said rose body extending into the interior thereof having a tapered hole in it of opposite taper for ensuring a water-tight junction of the watering-can rose with different watering-cans, a perforated rigid rose disc for removable attachment to the rose body, and an inwardly curled annular flange preformed on the said rose disc for readily slipping over and off the said bead by hand by contraction of the rose body when connection of the rose disc to the rose body and disconnection of the rose from the rose body is desired.

JAMES ROBERT BUCHANAN.
THOMAS WILLIAM WATTS.